(12) United States Patent
Fujimaki

(10) Patent No.: US 12,450,989 B2
(45) Date of Patent: Oct. 21, 2025

(54) SEMI-SELF POS SYSTEM, REGISTRATION APPARATUS, METHOD, AND NON-TRANSITORY COMPUTER READABLE MEDIUM STORING PROGRAM

(71) Applicant: NEC Platforms, Ltd., Kawasaki (JP)

(72) Inventor: Yuri Fujimaki, Kanagawa (JP)

(73) Assignee: SteeRetail Co., Ltd., Kanagawa (JP)

( * ) Notice: Subject to any disclaimer, the term of this patent is extended or adjusted under 35 U.S.C. 154(b) by 149 days.

(21) Appl. No.: 18/533,292

(22) Filed: Dec. 8, 2023

(65) Prior Publication Data

US 2024/0203215 A1    Jun. 20, 2024

(30) Foreign Application Priority Data

Dec. 15, 2022   (JP) ................. 2022-200076

(51) Int. Cl.
G07G 1/00 (2006.01)
(52) U.S. Cl.
CPC ......... G07G 1/0045 (2013.01); G07G 1/0009 (2013.01)
(58) Field of Classification Search
CPC ........................... G07G 1/0045; G07G 1/0009
See application file for complete search history.

(56) References Cited

U.S. PATENT DOCUMENTS

| | | | | |
|---|---|---|---|---|
| 2011/0055031 A1* | 3/2011 | Takagi | ................... | G06Q 30/06 705/16 |
| 2017/0193478 A1* | 7/2017 | Dhurka | ................ | G07G 1/0054 |
| 2023/0086388 A1* | 3/2023 | Iizuka | ................... | G06Q 20/12 705/39 |

FOREIGN PATENT DOCUMENTS

| | | | |
|---|---|---|---|
| JP | 2017062671 A | * | 3/2017 |
| JP | 2017-130240 A | | 7/2017 |
| JP | 2018022526 A | * | 2/2018 |
| JP | 2019-128782 A | | 8/2019 |
| JP | 2020080198 A | * | 5/2020 |
| JP | 2022075795 A | * | 5/2022 |

OTHER PUBLICATIONS

Xia, Kun, et al. "An intelligent self-service vending system for smart retail." Sensors 21.10 (2021): 3560. (Year: 2021).*
JP Office Action for Application No. 2022-200076, mailed on Aug. 29, 2023 with English Translation.

* cited by examiner

Primary Examiner — Nathan A Mitchell

(57) ABSTRACT

A semi-self POS system according to the present disclosure includes: a registration apparatus and an accounting apparatus, the accounting apparatus being able to communicate with the registration apparatus, in which the accounting apparatus captures, when an addition of a product is requested, a bar code image of an additional purchase product and transmits an additional purchase notification including the bar code image to the registration apparatus, and the registration apparatus displays, when it receives the additional purchase notification, the bar code image included in the additional purchase notification, reads the displayed bar code image and thereby registers the additional purchase product, calculates a new total amount of payment obtained by adding payment of the registered additional purchase product to the total amount of payment, and transmits new accounting information including the new total amount of payment to the accounting apparatus.

8 Claims, 10 Drawing Sheets

SEMI-SELF POS SYSTEM, REGISTRATION APPARATUS, METHOD, AND NON-TRANSITORY COMPUTER READABLE MEDIUM STORING PROGRAM

INCORPORATION BY REFERENCE

This application is based upon and claims the benefit of priority from Japanese patent application No. 2022-200076, filed on Dec. 15, 2022, the disclosure of which is incorporated herein in its entirety by reference.

TECHNICAL FIELD

The present disclosure relates to a semi-self POS system, a registration apparatus, and a non-transitory computer readable medium storing a program.

BACKGROUND ART

A semi-self POS system including a registration apparatus that reads bar codes of purchased products and calculates a total amount of payment by operations of store clerks and an accounting apparatus that can perform payment by operations of customers themselves is known. For example, in a semi-self POS system disclosed in Japanese Unexamined Patent Application Publication No. 2017-130240, a customer operates an accounting apparatus to hold payment, a store clerk performs an operation so that a registration apparatus reads a bar code of a product to be additionally purchased, and a new total amount obtained by adding payment of the additional purchase product to the original total amount of payment is calculated.

In the technology disclosed in Japanese Unexamined Patent Application Publication No. 2017-130240, when an additional purchase is to be made by a customer, an operation is required in which the customer passes a product to be additionally purchased (hereafter, the additional purchase product) to a store clerk and the store clerk performs an operation for reading the bar code of the additional purchase product. Therefore, it takes time and effort for the customer to make an additional purchase, such as having to stand in line again at a cash register, and thus loss of a sales opportunity may occur due to the customer giving up the additional purchase.

SUMMARY

The present disclosure has been made to solve the above-described problem and an object thereof is to provide a semi-self POS system, a registration apparatus, a method, and a non-transitory computer readable medium storing a program by which it is possible to easily register an additional purchase product.

A semi-self POS system according to the present disclosure includes:
  a registration apparatus configured to register a purchase product, calculate a total amount of payment for the purchase product, and transmit accounting information including the total amount of payment for the purchase product; and
  an accounting apparatus configured to perform accounting of the purchase product based on the received accounting information, the accounting apparatus being able to communicate with the registration apparatus, in which
  the accounting apparatus captures, when an addition of a product is requested, a bar code image of an additional purchase product,
  the accounting apparatus transmits an additional purchase notification including the bar code image to the registration apparatus,
  the registration apparatus displays, when the registration apparatus receives the additional purchase notification, the bar code image included in the additional purchase notification,
  the registration apparatus reads the displayed bar code image and thereby registers the additional purchase product,
  the registration apparatus calculates a new total amount of payment obtained by adding payment of the registered additional purchase product to the total amount of payment, and
  the registration apparatus transmits new accounting information including the new total amount of payment to the accounting apparatus.

A registration apparatus according to the present disclosure includes:
  a capturing request unit configured to request an accounting apparatus to capture a bar code image of an additional purchase product when an addition of a product is requested;
  a display unit configured to display the bar code image when an additional purchase notification including the bar code image is received;
  a registration unit configured to read the displayed bar code image and thereby register the additional purchase product;
  a calculation unit configured to calculate a new total amount of payment obtained by adding payment of the registered additional purchase product to an original total amount of payment; and
  an accounting request unit configured to transmit new accounting information including the new total amount of payment to the accounting apparatus and request the accounting apparatus to perform accounting.

A non-transitory computer readable medium according to the present disclosure storing an additional purchase product accounting program for causing a computer to execute:
  a capturing request process of requesting an accounting apparatus to capture a bar code image of an additional purchase product when an addition of a product is requested;
  a display process of displaying the bar code image when an additional purchase notification including the bar code image is received;
  a registration process of reading the displayed bar code image and thereby registering the additional purchase product;
  a calculation process of calculating a new total amount of payment obtained by adding payment of the registered additional purchase product to an original total amount of payment; and
  an accounting request process of transmitting new accounting information including the new total amount of payment to the accounting apparatus and requesting the accounting apparatus to perform accounting.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Example embodiments according to the present disclosure will be described in detail below with reference to the drawings. The same or corresponding elements are denoted by the same reference symbols throughout the drawings, and redundant descriptions thereof will be omitted as necessary for the clarification of the description.

First Example Embodiment

Figure 1:
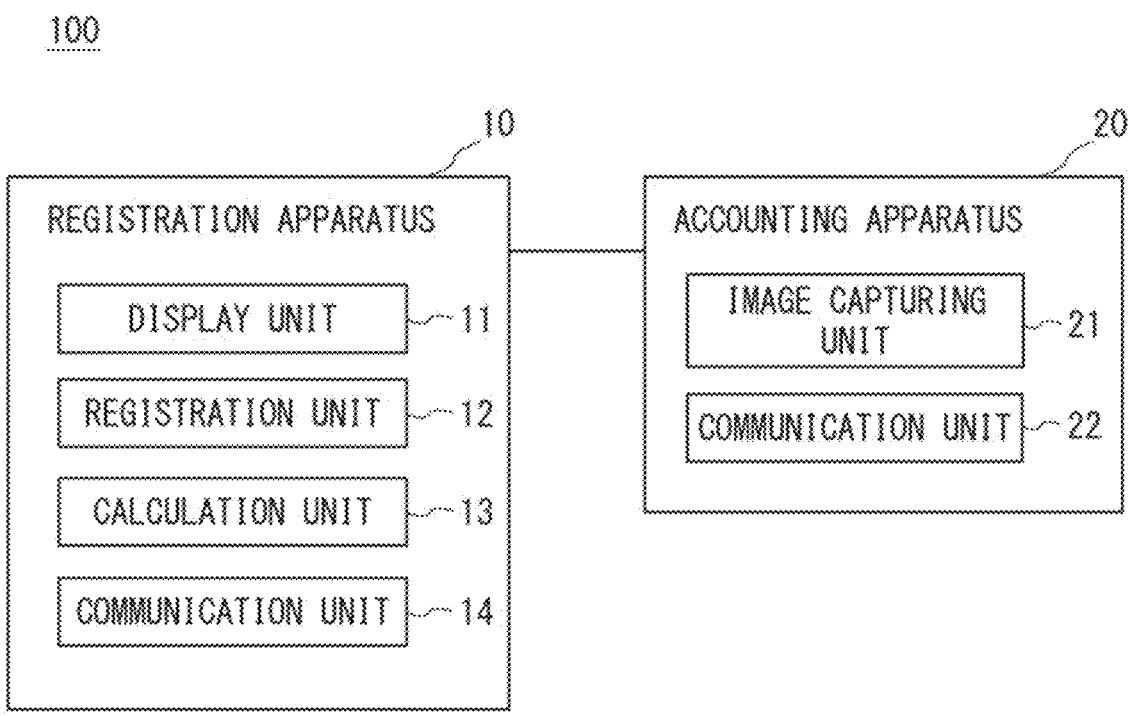
FIG. 1 is a block diagram showing a configuration of a semi-self POS system according to a first example embodiment.

FIG. 1 is a block diagram showing a configuration of a semi-self POS system 100 according to a first example embodiment. The semi-self POS system 100 includes a registration apparatus 10 and an accounting apparatus 20. The registration apparatus 10 and the accounting apparatus 20 are connected to each other through a network and can communicate with each other. The network may be wired or wireless. The registration apparatus 10 includes a display unit 11, a registration unit 12, a calculation unit 13, and a communication unit 14. The accounting apparatus 20 includes an image capturing unit 21 and a communication unit 22.

The semi-self POS system 100 is a system for performing accounting at retail stores such as supermarkets, convenience stores, and drug stores. The registration apparatus 10 is an apparatus that registers a purchase product by reading a bar code of the product by an operation of a store clerk and calculates the total amount of payment. The registration apparatus 10 transmits accounting information including the calculated total amount of payment to the accounting apparatus 20. The accounting apparatus 20 is an apparatus that performs accounting of the purchase product by an operation of a customer based on the accounting information received from the registration apparatus 10. That is, the semi-self POS system 100 is an accounting system that performs bar code reading and accounting processes for a purchase product in different apparatuses, and operations related to accounting processes are performed by customers themselves.

When a customer adds a product before the accounting is performed after the bar code reading of a product is completed, and then the accounting is performed, that is, when a customer additionally purchases a product, the customer requests an addition of a product by operating the accounting apparatus 20. Note that when a customer additionally purchases a product, the customer has the additional purchase product at hand. The image capturing unit 21 included in the accounting apparatus 20 is an image capturing apparatus such as a Web camera. When a customer requests an addition of a product, the image capturing unit 21 is started and captures an image including a bar code of an additional purchase product held by the customer. The communication unit 22 transmits an additional purchase notification including the bar code image captured by the image capturing unit 21 to the registration apparatus 10.

When the display unit 11 included in the registration apparatus 10 receives the additional purchase notification from the accounting apparatus 20, the display unit 11 displays the bar code image included in the additional purchase notification. The registration unit 12 registers the additional purchase product by reading the bar code image displayed on the display unit 11 by an operation of a store clerk. The calculation unit 13 calculates a new total amount of payment obtained by adding payment of the additional purchase product registered by the registration unit 12. The communication unit 14 transmits new accounting information including the new total amount of payment calculated by the calculation unit 13 to the accounting apparatus 20.

Figure 2:
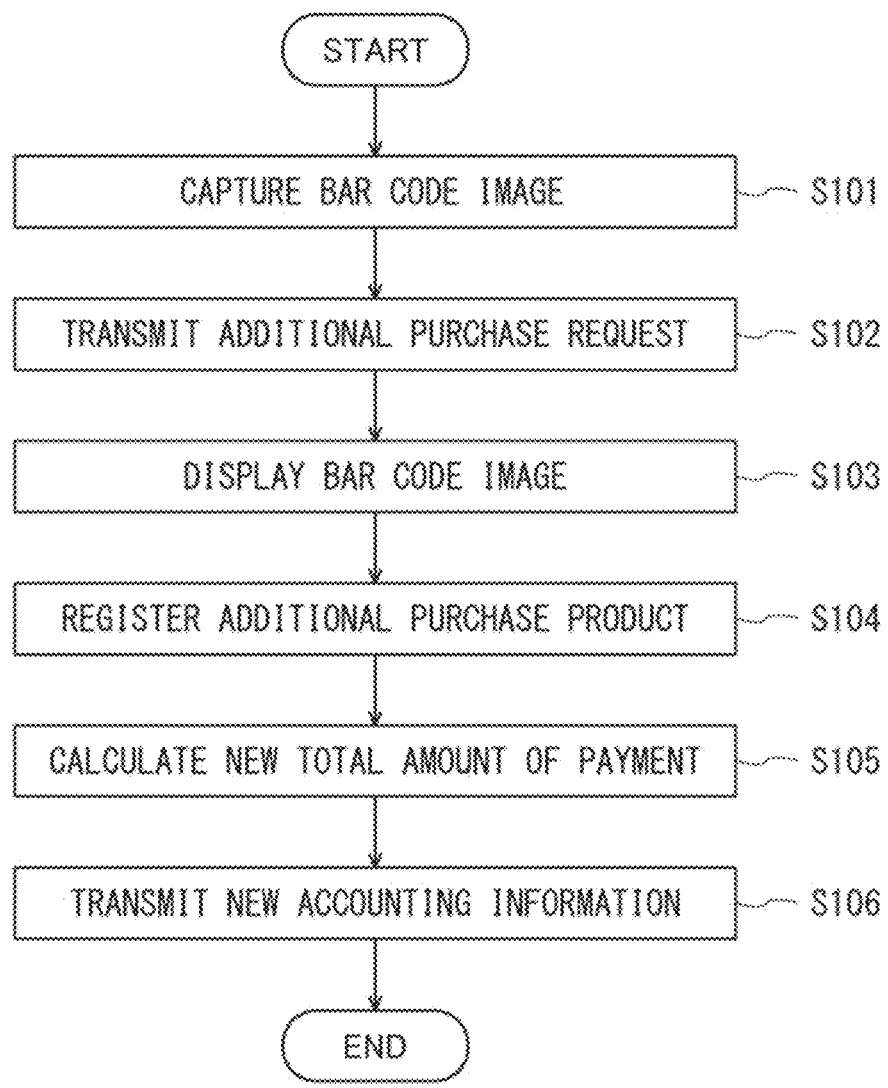
FIG. 2 is a flowchart showing a flow of an accounting method for an additional purchase product according to the first example embodiment.

FIG. 2 is a flowchart showing a flow of an accounting method for an additional purchase product according to the first example embodiment. When a customer requests an addition of a product, the image capturing unit 21 captures a bar code image of the additional purchase product (Step S101). Next, the communication unit 22 transmits an additional purchase notification including the bar code image to the registration apparatus 10 (Step S102). When the display unit 11 receives the additional purchase notification, it displays the bar code image included in the additional purchase notification (Step S103). Next, the registration unit 12 reads the displayed bar code image and registers the additional purchase product (Step S104). Next, the calculation unit 13 calculates a new total amount of payment obtained by adding payment of the registered additional purchase product (Step S105). Next, the communication unit 22 transmits new accounting information including the new total amount of payment to the accounting apparatus 20 (Step S106). As described above, in the accounting method for an additional purchase product according to this example embodiment, a customer is not required to go to the registration apparatus 10 in order to have the registration apparatus 10 read the bar code of the additional purchase product, and therefore the customer can easily register the additional purchase product. Further, in the accounting method for an additional purchase product according to this example embodiment, since a customer does not register an additional purchase product, the customer can be prevented from performing unauthorized operations.

Second Example Embodiment

A second example embodiment is a modified example of the first example embodiment. In the semi-self POS system 100 according to the first example embodiment, the accounting apparatus 20 performs processing such as starting of the image capturing unit 21. Meanwhile, in a semi-self POS system 200 according to this example embodiment, operations performed by an accounting apparatus 40 are performed by processing of a registration apparatus 30.

Figure 3:
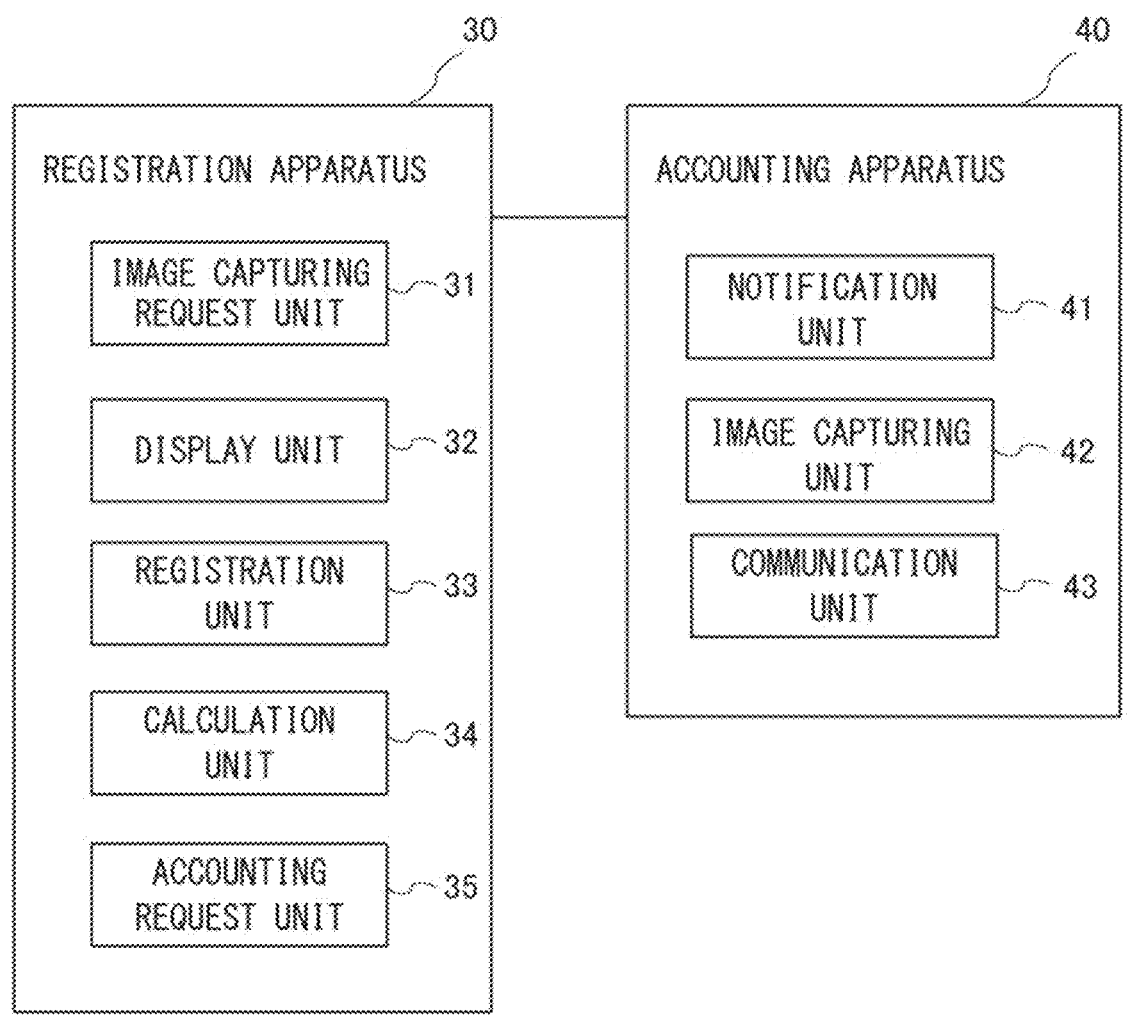
FIG. 3 is a block diagram showing a configuration of a semi-self POS system according to a second example embodiment.

FIG. 3 is a block diagram showing a configuration of the semi-self POS system 200 according to the second example embodiment. When the configuration of the semi-self POS system 200 is compared to that of the semi-self POS system 100 shown in FIG. 1, the registration apparatus 10 is replaced with the registration apparatus 30, and the accounting apparatus 20 is replaced with the accounting apparatus 40. When the registration apparatus 30 is compared to the registration apparatus 10 shown in FIG. 1, an image capturing request unit 31 is added, and the communication unit 14 is replaced with an accounting request unit 35. When the accounting apparatus 40 is compared to the accounting apparatus 20 shown in FIG. 1, a notification unit 41 is added. Regarding the description of the components included in the semi-self POS system 200, parts of the description thereof that are redundant with respect to those of the first example embodiment will be omitted as appropriate.

When a customer requests an addition of a product, the notification unit 41 included in the accounting apparatus 40 transmits to the registration apparatus 30 a product addition request notification including information that a customer requests an addition of a product. When an image capturing unit 42 receives an image capturing request notification from the registration apparatus 30, the image capturing unit 42 is started and captures an image including a bar code of the additional purchase product held by the customer. A communication unit 43 transmits an additional purchase notification including the bar code image captured by the image capturing unit 42 to the registration apparatus 30.

When the image capturing request unit 31 included in the registration apparatus 30 receives the product addition request notification from the accounting apparatus 40, it transmits an image capturing request notification including a request for the starting of the image capturing unit 42 and a request for the capturing of a bar code image of the additional purchase product to the accounting apparatus 40. When a display unit 32 receives an additional purchase notification from the accounting apparatus 40, it displays the bar code image included in the additional purchase notification. The store clerk performs an operation so that the registration unit 33 reads the barcode image displayed on the display unit 32 and registers the additional purchase product. A calculation unit 34 calculates a new total amount of payment obtained by adding payment of the additional purchase product registered by the registration unit 33. The accounting request unit 35 transmits new accounting information including the new total amount of payment calculated by the calculation unit 34 to the accounting apparatus 40 and requests the accounting apparatus 40 to perform accounting.

Figure 4:
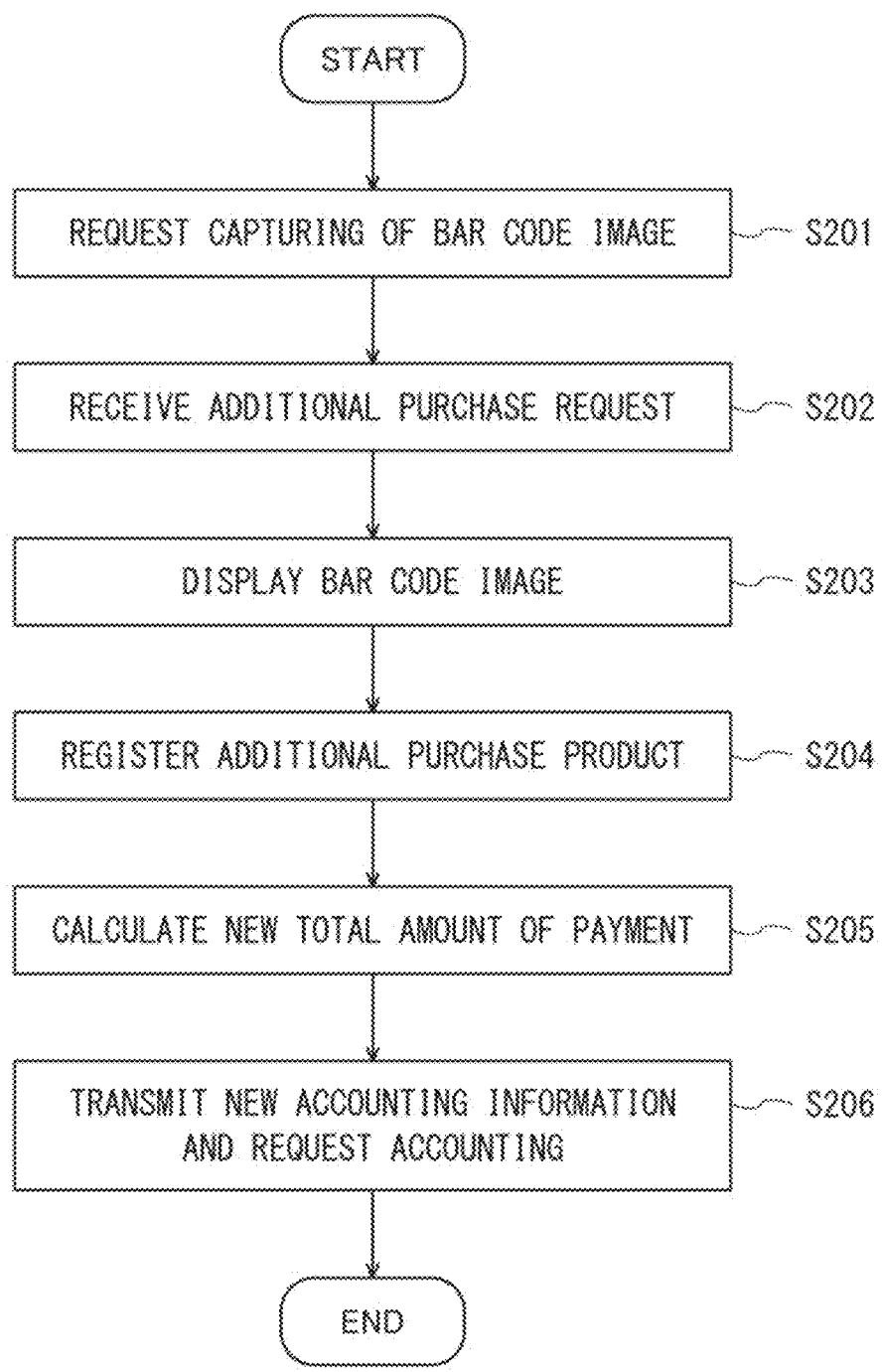
FIG. 4 is a flowchart showing a flow of an accounting method for an additional purchase product according to the second example embodiment.

FIG. 4 is a flowchart showing a flow of an accounting method for an additional purchase product according to the second example embodiment. When an addition of a product is requested, the image capturing request unit 31 requests the accounting apparatus 40 to capture a bar code image of an additional purchase product (Step S201). When the display unit 32 receives an additional purchase notification including the bar code image from the accounting apparatus 40 (Step S202), the display unit 32 displays the bar code image included in the additional purchase notification (Step S203). Next, the registration unit 33 reads the displayed bar code image and registers the additional purchase product (Step S204). Next, the calculation unit 34 calculates a new total amount of payment obtained by adding payment of the registered additional purchase product (Step S205). Next, the accounting request unit 35 transmits new accounting information including the new total amount of payment to the accounting apparatus 40 and requests the accounting apparatus 40 to perform accounting (Step S206). The semi-self POS system 200 according to this example embodiment can provide an effect similar to that described in the first example embodiment.

Note that the registration apparatus 30 includes a processor, a memory, and a storage device as components that are not shown. Further, the storage device stores a computer program in which processes of the accounting method for an additional purchase product according to this example embodiment are implemented. Further, the processor loads a computer program from the storage device into the memory and executes the loaded computer program. By the above configuration, the processor implements the functions of the image capturing request unit 31, the display unit 32, the registration unit 33, the calculation unit 34, and the accounting request unit 35.

Alternatively, each of the image capturing request unit 31, the display unit 32, the registration unit 33, the calculation unit 34, and the accounting request unit 35 may be implemented by dedicated hardware. Further, some or all of the components may be implemented by general-purpose or dedicated circuitry, a processor, or the like, or a combination thereof. They may be formed of a single chip, or may be formed of a plurality of chips connected to each other through a bus. Some or all of the components of each apparatus may be implemented by a combination of the above-described circuitry or the like and a program. Further, as the processor, a Central Processing Unit (CPU), a Graphics Processing Unit (GPU), a field-programmable gate array (FPGA), or the like may be used.

Further, when some or all of the components of the registration apparatus 30 are implemented by a plurality of information processing apparatuses, circuits, or the like, the plurality of information processing apparatuses, circuits, or the like may be disposed in one place in a centralized manner or arranged in a distributed manner. For example, the information processing apparatuses, the circuits, or the like may be implemented as a form in which the information processing apparatuses, the circuits, or the like are connected to each other through a communication network, such as a client server system, a cloud computing system, or the like. Further, the functions of the registration apparatus 10 may be provided in the form of Software as a Service (Saas).

Third Example Embodiment

Figure 5:
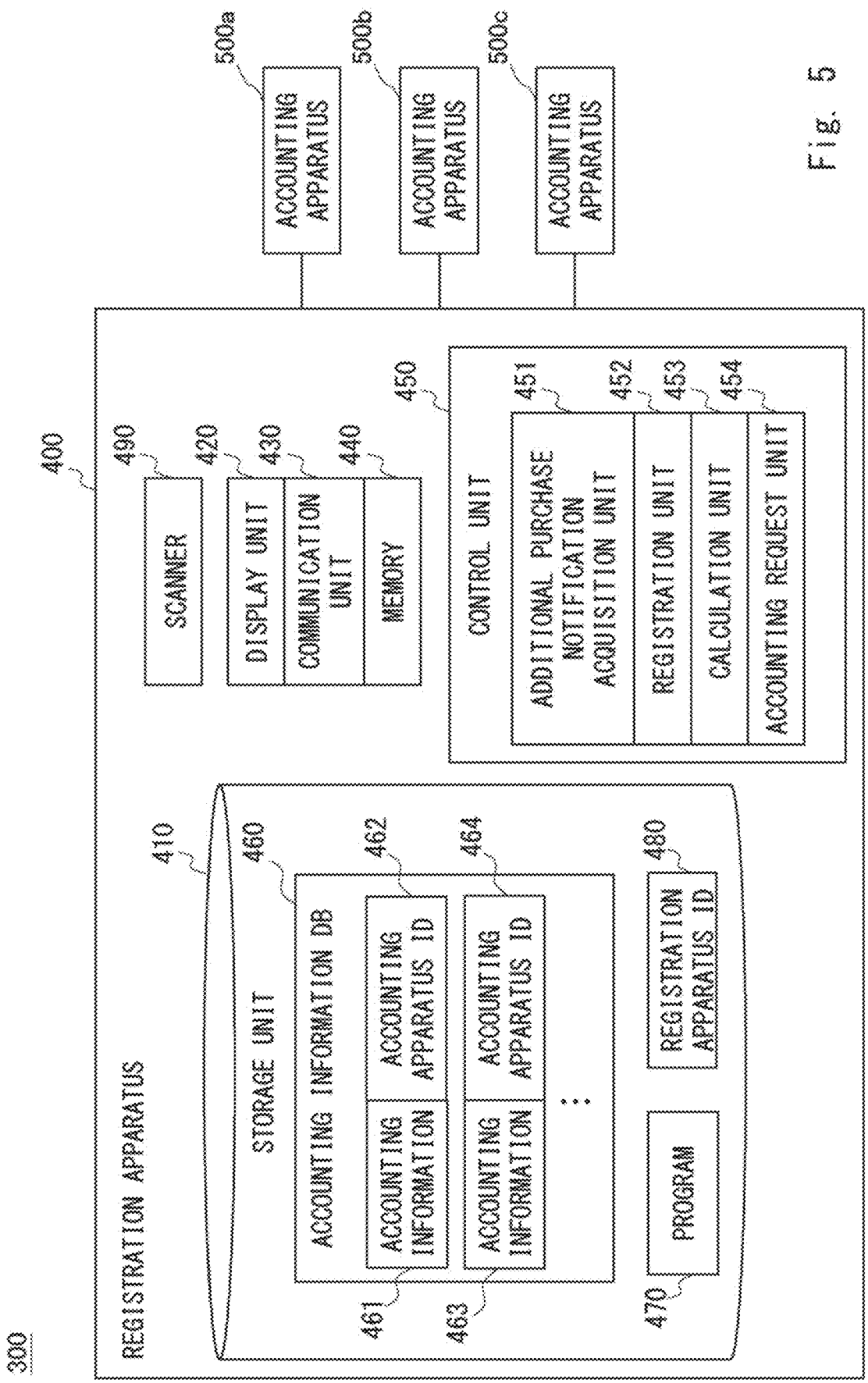
FIG. 5 is a block diagram showing a configuration of a semi-self POS system according to a third example embodiment.

A third example embodiment is a specific example of the first example embodiment described above. FIG. 5 is a block diagram showing a configuration of a semi-self POS system 300 according to the third example embodiment. The semi-self POS system 300 includes a registration apparatus 400 and accounting apparatuses 500 (500a to 500c). Each of the accounting apparatuses 500a to 500c are connected to the registration apparatus 400 through a network. Note that parts of the description that are redundant with respect to those of the first example embodiment will be omitted as appropriate.

The registration apparatus 400 is an information processing apparatus for registering a bar code of a purchase product which a customer wishes to purchase by an operation of a store clerk, calculating a total amount for the purchase product, and transmitting accounting information including the calculated total amount to the accounting apparatus 500. The registration apparatus 400 is, for example, a server apparatus implemented by a computer. The accounting apparatus 500 is an information processing apparatus that performs accounting of the purchase product based on accounting information received from the registration apparatus 400 by an operation of a customer. Note that, in this example embodiment, although a case in which three accounting apparatuses 500 are connected to one registration apparatus 400 will be described, the number of accounting apparatuses 500 connected to one registration apparatus 400 is not limited to a particular number, and may be, for example, one or four or greater. The registration apparatus 400 and the accounting apparatus 500 are normally installed in a store.

As shown in FIG. 5, the registration apparatus 400 includes a storage unit 410, a display unit 420, a communication unit 430, a memory 440, a control unit 450, and a scanner 490.

The storage unit 410 is a storage device that stores at least an accounting information DB 460 and a program 470, and may also store a registration apparatus ID 480. The accounting information may include at least a total amount for purchase products, and may also include date and time information and an accounting number. The date and time information is information about the date and time when the total amount was calculated. The accounting number is information for identifying accounting information. The accounting information DB 460 is a database of information in which an accounting apparatus ID corresponding to the accounting apparatus 500 to which accounting information has been transmitted is associated with the accounting information. The accounting apparatus ID is information for identifying the accounting apparatuses 500a to 500c, and is, for example, an identification number. As shown in FIG. 5, accounting information 461 is associated with a corresponding accounting apparatus ID 462 and accounting information 463 is associated with a corresponding accounting apparatus ID 464. The program 470 is a computer program in which additional purchase product registration processes are implemented. The registration apparatus ID 480 is information for identifying the registration apparatus 400.

The display unit 420 is a display terminal that displays a result of reading of a purchase product, the total amount, and an additional purchase notification, and the like to a store clerk operating the registration apparatus 400. The communication unit 430 is an interface for communicating with the outside of the registration apparatus 400. The memory 440 is a storage area for temporarily storing processing contents of the control unit 450, and is, for example, a volatile storage device such as a Random Access Memory (RAM). The scanner 490 is a reading apparatus for a store clerk to perform an operation for reading a bar code of a product, and is, for example, a bar code reader.

The control unit 450 includes an additional purchase notification acquisition unit 451, a registration unit 452, a calculation unit 453, and an accounting request unit 454. The control unit 450 is a control apparatus that controls operations of the registration apparatus 400, and is, for example, a processor such as a CPU. The control unit 450 loads the program 470 from the storage unit 410 into the memory 440 and executes it. By doing so, the control unit 450 implements the functions as the additional purchase notification acquisition unit 451, the registration unit 452, the calculation unit 453, and the accounting request unit 454.

The additional purchase notification acquisition unit 451 acquires an additional purchase notification by receiving it from the accounting apparatuses 500a to 500c. The additional purchase notification includes a bar code image of an additional purchase product and an accounting apparatus ID corresponding to the accounting apparatus 500 which has transmitted the additional purchase notification, and preferably includes an accounting number. When the additional purchase notification acquisition unit 451 receives the additional purchase notification, it displays a notification button on the display unit 420. When a store clerk presses the notification button, the additional purchase notification acquisition unit 451 displays the bar code image included in the additional purchase notification on the display unit 420.

The store clerk holds the scanner 490 over a bar code part of a product and performs an operation for reading the bar code of the product. The registration unit 452 registers the product corresponding to the bar code read by the store clerk's operation as a purchase product in the storage unit 410. The registration unit 452 registers the accounting information 461 and the accounting information 463 including purchase product information such as the product name and the number of purchase products in the accounting information DB 460. The registration unit 452 generates accounting information when it registers the purchase product information in the accounting information DB 460. When the registration unit 452 generates accounting information, it may generate an accounting number corresponding to the accounting information and register the accounting information including the accounting number in the accounting information DB. When the registration unit 452 generates the accounting number, processing related to accounting, processing related to an additional purchase, and the like may be managed based on the accounting number. The calculation unit 453 calculates a total amount for the purchase products registered by the registration unit 452. Specifically, the calculation unit 453 calculates a total amount for the purchase products registered in the storage unit 410 and adds the total amount to the accounting information 461 and the accounting information 463 registered in the accounting information DB 460. The accounting request unit 454 requests the accounting apparatus 500 to perform accounting by transmitting the accounting information including the total amount calculated by the calculation unit 453 to the accounting apparatus 500. The accounting request unit 454 associates the accounting apparatus ID corresponding to the accounting apparatus 500 to which the accounting information has been transmitted with the accounting information and registers them in the accounting information DB.

When a product is additionally purchased, the registration unit 452 reads the bar code image displayed in the display unit 420 by an operation of a store clerk, and adds additional purchase product information to the accounting information registered in the accounting information DB 460. The calculation unit 453 calculates a new total amount of payment by adding payment of the additional purchase product to the total amount included in the accounting information registered in the accounting information DB 460, i.e., the original total amount, and updates the total amount included in the accounting information registered in the accounting information DB 460. The accounting request unit 454 transmits new accounting information including the new total amount calculated by the calculation unit 453 to the accounting apparatus 500.

Figure 6:
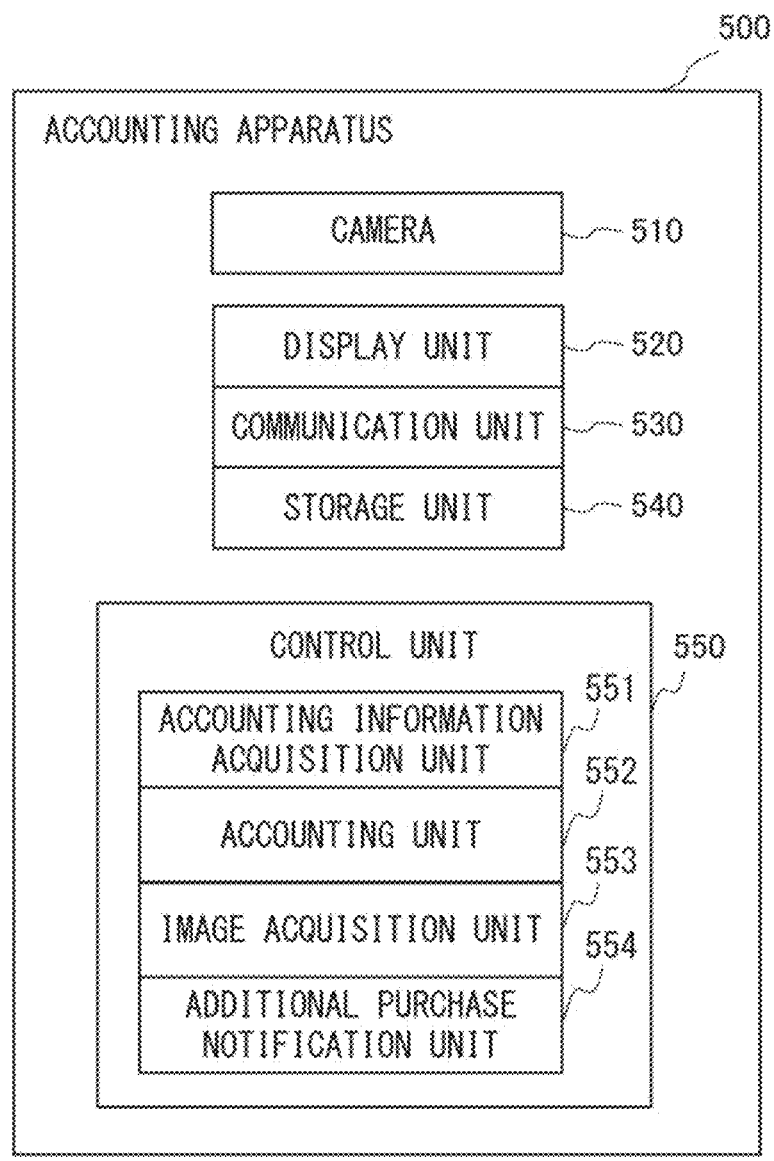
FIG. 6 is a block diagram showing a configuration of an accounting apparatus.

A configuration of the accounting apparatus 500 will be described with reference to FIG. 6. FIG. 6 is a block diagram showing the configuration of the accounting apparatus 500. The accounting apparatus 500 includes at least a camera 510, a display unit 520, a communication unit 530, a storage unit 540, and a control unit 550, and may also include a printer, a money transfer machine, and the like that are not shown.

The camera 510 is a predetermined image capturing apparatus, and is, for example, a Web camera. The camera 510 captures an image including a bar code of an additional purchase product held by a customer. The display unit 520 is a display terminal that displays the total amount, a product addition button, and the like to a customer operating the accounting apparatus 500. The communication unit 530 is an interface for communicating with the outside of the accounting apparatus 500. The storage unit 540 is a storage device that stores a program executed by the accounting apparatus 500, an accounting apparatus ID for identifying the accounting apparatus 500, and the like.

The control unit 550 includes an accounting information acquisition unit 551, an accounting unit 552, an image acquisition unit 553, and an additional purchase notification unit 554. The control unit 550 is a control apparatus that controls operations of the accounting apparatus 500, and is, for example, a processor such as a CPU. The control unit 550 loads a program from the storage unit 540 into a memory (not shown) and executes it. By doing so, the control unit 550 implements the functions as the accounting information acquisition unit 551, the accounting unit 552, the image acquisition unit 553, and the additional purchase notification unit 554.

When the accounting information acquisition unit 551 receives accounting information from the registration apparatus 400, it displays an accounting screen on the display unit 520. The total amount included in the received accounting information, an accounting button, and a product addition button are displayed on the accounting screen. When a customer performs accounting, the customer presses the accounting button. The accounting unit 552 performs accounting when the accounting button is pressed. The accounting method is not limited to a particular method, and may be, for example, a cash payment, or an electronic payment such as a credit card payment, a debit card payment, and a QR code (registered trademark) payment.

When a customer additionally purchases a product, the customer presses the product addition button displayed on the display unit 520. When the product addition button is pressed, the image acquisition unit 553 starts the camera 510 and displays on the display unit 520 a message urging a customer to position the barcode image so that the camera 510 can capture an image of the barcode. The message urging a customer to do the above is, for example, "place the product you want to purchase on the desk so that the bar code faces toward the camera". The customer moves the additional purchase product to a predetermined position in accordance with the message displayed on the display unit 520. The camera 510 captures an image of the additional purchase product that has been moved to the predetermined position. At this time, if the additional purchase product is arranged so that the bar code faces toward the camera 510, the image captured by the camera 510 includes the bar code image. The additional purchase notification unit 554 transmits an additional purchase notification including the bar code image captured by the camera 510 to the registration apparatus 400. The additional purchase notification may include an accounting apparatus ID for identifying the accounting apparatus 500. When the additional purchase notification includes the accounting apparatus ID, the registration apparatus 400 can identify the accounting apparatus 500 that has transmitted the additional purchase notification.

Figure 7:
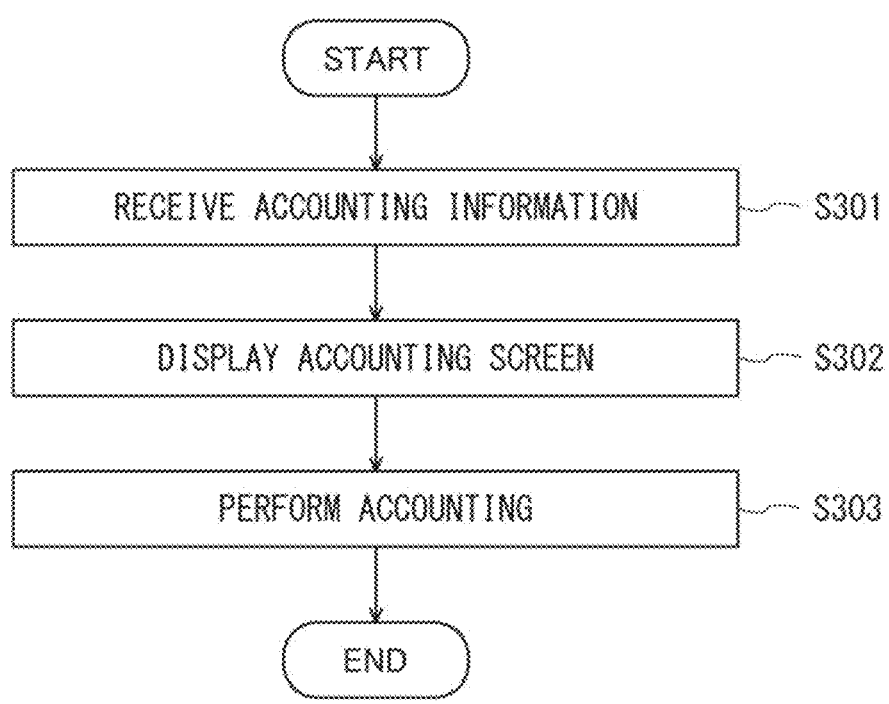
FIG. 7 is a flowchart showing a flow of accounting processes.

Operations of the accounting apparatus 500 when accounting is performed will be described with reference to FIG. 7. FIG. 7 is a flowchart showing a flow of accounting processes.

When accounting information is received from the registration apparatus 400 (Step S301), the display unit 520 displays an accounting screen (Step S302). The total amount, an accounting button, and a product addition button are displayed on the accounting screen. When a customer presses the accounting button displayed on the accounting screen, the accounting unit 552 performs accounting (Step S303).

Figure 8:
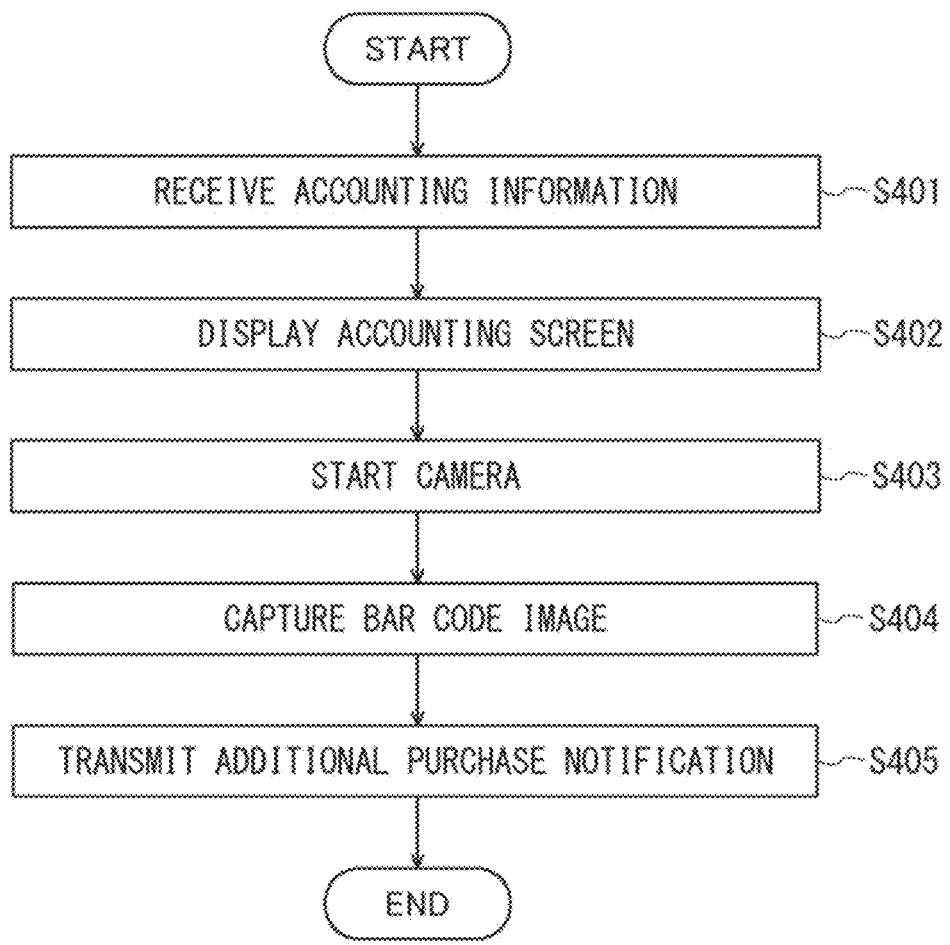
FIG. 8 is a flowchart showing a flow of additional purchase request processes.

Operations of the accounting apparatus 500 when an addition of a product is requested will be described with reference to FIG. 8. FIG. 8 is a flowchart showing a flow of additional purchase request processes. The accounting processes shown in FIG. 7 are operations of the accounting apparatus 500 when a customer does not add a product. Meanwhile, the additional purchase request processes shown in FIG. 8 are operations of the accounting apparatus 50 when a customer adds a product.

Similar to the accounting processes shown in FIG. 7, when accounting information is received from the registration apparatus 400 (Step S401), the display unit 520 displays an accounting screen (Step S402). When a customer wishes to add a product, the customer presses a product addition button displayed on the display unit 520. When the product addition button is pressed, the image acquisition unit 553 starts the camera 510 (Step S403). Next, the camera 510 captures a bar code image of an additional purchase product (Step S404). The additional purchase notification unit 554 transmits an additional purchase notification including the bar code image captured in Step S404 to the registration apparatus 400 (Step S405).

Figure 9:
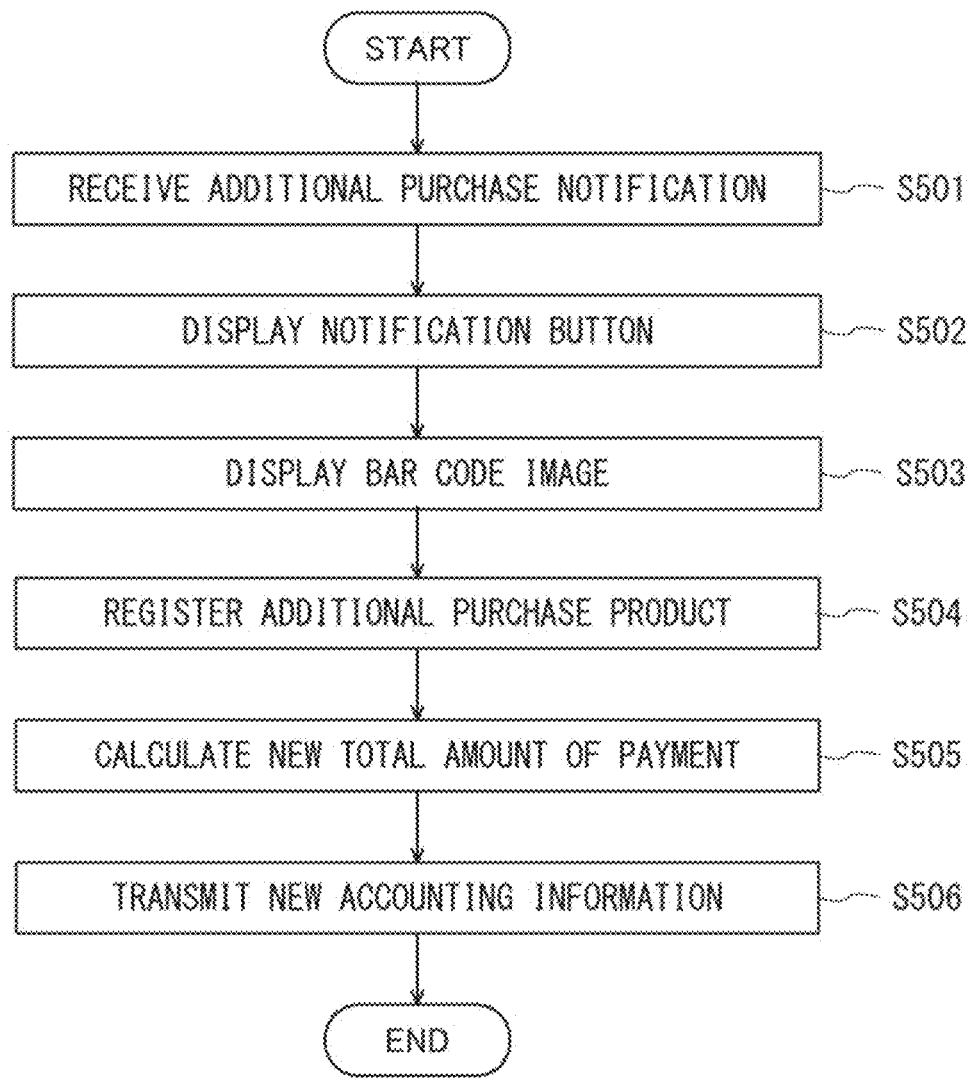
FIG. 9 is a flowchart showing a flow of additional purchase product registration processes.

Operations of the registration apparatus 400 when an additional purchase notification is received will be described with reference to FIG. 9. FIG. 9 is a flowchart showing a flow of additional purchase product registration processes.

When an additional purchase notification is received from the accounting apparatus 500 (Step S501), the display unit 420 displays a notification button (Step S502). A store clerk presses the notification button at a convenient time. When the notification button is pressed, the display unit 420 displays a bar code image included in the additional purchase notification (Step S503). When the store clerk operates the scanner 490 to perform an operation for reading the bar code image, the registration unit 452 registers an additional purchase product corresponding to the bar code as a purchase product (Step S504). When the additional purchase notification includes an accounting apparatus ID, the registration unit 452 adds the additional purchase product as the purchase product to accounting information associated with an accounting apparatus ID that matches the accounting apparatus ID included in the additional purchase notification among pieces of accounting information stored in the accounting information DB 460. Next, the calculation unit 453 calculates a new total amount of payment including payment of the additional purchase product (Step S505). Then, the accounting request unit 454 transmits new accounting information including the new total amount to the accounting apparatus 500 that has transmitted the additional purchase notification.

Figure 10:
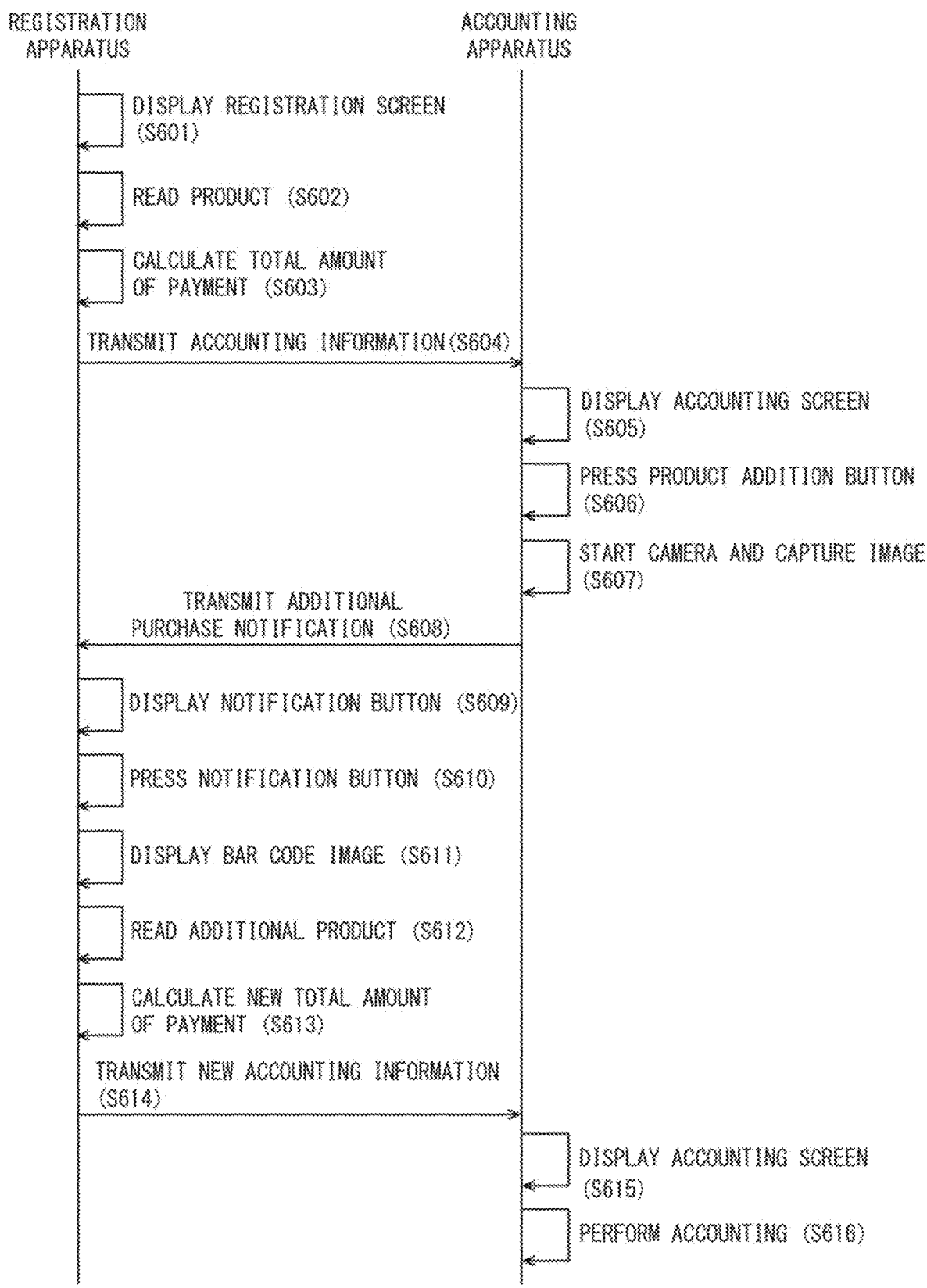
FIG. 10 is a sequence diagram showing a flow of an accounting method for an additional purchase product.

Next, operations of the semi-self POS system 300 when accounting of an additional purchase product is performed will be described with reference to FIG. 10. FIG. 10 is a sequence diagram showing a flow of an accounting method for an additional purchase product. FIG. 10 is a diagram for explaining a sequence of operations for a reading of a product made by a store clerk's operation, a request for an additional purchase made by a customer's operation, a reading of an additional purchase product, and an accounting. It is assumed that, when a customer makes an additional purchase of a product, the customer has the additional purchase product at hand.

First, a store clerk operates a switch or the like (not shown) to display a registration screen on the display unit 420 (Step S601). Buttons for the store clerk to operate when a product is registered, such as a correction button and a total amount calculation button, are displayed on the registration screen. Next, the store clerk operates the scanner 490 to perform an operation for reading the product (Step S602). When the store clerk has completed the operation for reading the product, the store clerk presses the total amount calculation button displayed on the registration screen and causes the calculation unit 453 to calculate a total amount of payment (Step S603). The accounting request unit 454 transmits accounting information including the total amount calculated in Step S603 to the accounting apparatus 500 (Step S604).

When the accounting information is received, the display unit 520 displays an accounting screen (Step S605). When a customer presses a product addition button (Step S606), the camera 510 is started and captures a bar code image of the additional purchase product (Step S607). The additional purchase notification unit 554 transmits an additional purchase notification including the bar code image captured in Step S607 to the registration apparatus 400 (Step S608).

When the additional purchase notification is received, the display unit 420 displays a notification button (Step S609). When the store clerk presses the notification button (Step S610), the display unit 420 displays a bar code image included in the additional purchase notification (Step S611). The store clerk operates the scanner 490 to perform an operation for reading the bar code image displayed in Step S611 (Step S612). The calculation unit 453 calculates a new total amount of payment including payment of the additional purchase product corresponding to the bar code image read in Step S612 (Step S613). The accounting request unit 454 transmits new accounting information including the new total amount calculated in Step S613 to the accounting apparatus 500 (Step S614).

When the new accounting information is received, the display unit 520 displays the accounting screen including the new total amount (Step S615). The customer confirms the new total amount displayed in Step S615, presses an accounting button, and causes the accounting unit 552 to perform accounting (Step S616).

Other Example Embodiments

In the third example embodiment, the semi-self POS system including one registration apparatus 400 has been described. However, the semi-self POS system may include a plurality of registration apparatuses. In this case, each of the registration apparatuses 400 stores the registration apparatus ID 480 in the storage unit 410, and transmits accounting information including its own registration apparatus ID 480 when it requests the accounting apparatus 500 to perform accounting. Further, the accounting apparatus 500 transmits an additional purchase notification to the registration apparatus 400 corresponding to the registration apparatus ID included in the accounting information.

Note that, although the present disclosure has been described as a hardware configuration in the above example embodiments, the present disclosure is not limited thereto. In the present disclosure, any processing can also be implemented by causing a CPU to execute a computer program.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, DVD (Digital Versatile Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and may be changed as appropriate without departing from the scope and spirit of the present disclosure. Further, the present disclosure may be executed by combining the example embodiments with one another as appropriate.

According to the present disclosure, it is possible to provide a semi-self POS system, a registration apparatus, a method, and a program by which it is possible to easily register an additional purchase product.

The first, second, and third example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A semi-self POS system comprising:
a registration apparatus configured to register a purchase product, calculate a total amount of payment for the purchase product, and transmit accounting information including the total amount of payment for the purchase product; and
an accounting apparatus configured to perform accounting of the purchase product based on the received accounting information, the accounting apparatus being able to communicate with the registration apparatus, wherein
the accounting apparatus captures, when an addition of a product is requested, a bar code image of an additional purchase product,
the accounting apparatus transmits an additional purchase notification including the bar code image to the registration apparatus,
the registration apparatus displays, when the registration apparatus receives the additional purchase notification, the bar code image included in the additional purchase notification, the registration apparatus reads the displayed bar code image and thereby registers the additional purchase product, the registration apparatus calculates a new total amount of payment obtained by adding payment of the registered additional purchase product to the total amount of payment, and the registration apparatus transmits new accounting information including the new total amount of payment to the accounting apparatus.

2. The semi-self POS system according to claim 1, wherein when the registration apparatus receives the additional purchase notification, the registration apparatus displays a notification button indicating that the notification is received, and when the notification button is pressed, the registration apparatus displays the bar code image included in the additional purchase notification.

3. The semi-self POS system according to claim 1, wherein
the accounting apparatus displays a product addition button on a screen on which the accounting information is displayed, and
the accounting apparatus urges capturing of an image including the bar code of the additional purchase product when the product addition button is pressed.

4. The semi-self POS system according to claim 1, wherein
the additional purchase notification transmitted by the accounting apparatus includes accounting apparatus identification information for identifying the accounting apparatus that has transmitted the additional purchase notification, and
the registration apparatus transmits the new accounting information to the accounting apparatus corresponding to the accounting apparatus identification information included in the additional purchase notification.

5. The semi-self POS system according to claim 1, wherein
the accounting information transmitted by the registration apparatus includes registration apparatus identification information for identifying the registration apparatus that has transmitted the accounting information, and
the accounting apparatus transmits the additional purchase notification to the registration apparatus corresponding to the registration apparatus identification information included in the accounting information.

6. A registration apparatus comprising:
at least one memory; and
at least one processor coupled to the at least one memory, the at least one processor being configured to:
request an accounting apparatus to capture a bar code image of an additional purchase product when an addition of a product is requested;
display the bar code image when an additional purchase notification including the bar code image is received;
read the displayed bar code image and thereby register the additional purchase product;
calculate a new total amount of payment obtained by adding payment of the registered additional purchase product to an original total amount of payment; and
transmit new accounting information including the new total amount of payment to the accounting apparatus and request the accounting apparatus to perform accounting.

7. The registration apparatus according to claim 6, wherein when the at least one processor receives the additional purchase notification, the at least one processor displays a notification button indicating that the notification is received, and when the notification button is pressed, the at least one processor displays the bar code image included in the additional purchase notification.

8. A non-transitory computer readable medium storing an additional purchase product accounting program for causing a computer to execute:
a capturing request process of requesting an accounting apparatus to capture a bar code image of an additional purchase product when an addition of a product is requested;
a display process of displaying the bar code image when an additional purchase notification including the bar code image is received;
a registration process of reading the displayed bar code image and thereby registering the additional purchase product;
a calculation process of calculating a new total amount of payment obtained by adding payment of the registered additional purchase product to an original total amount of payment; and
an accounting request process of transmitting new accounting information including the new total amount of payment to the accounting apparatus and requesting the accounting apparatus to perform accounting.

* * * * *